D. VINCENT & D. JOHNEN.
Weighing-Scales.
No. 228,843. Patented June 15, 1880.
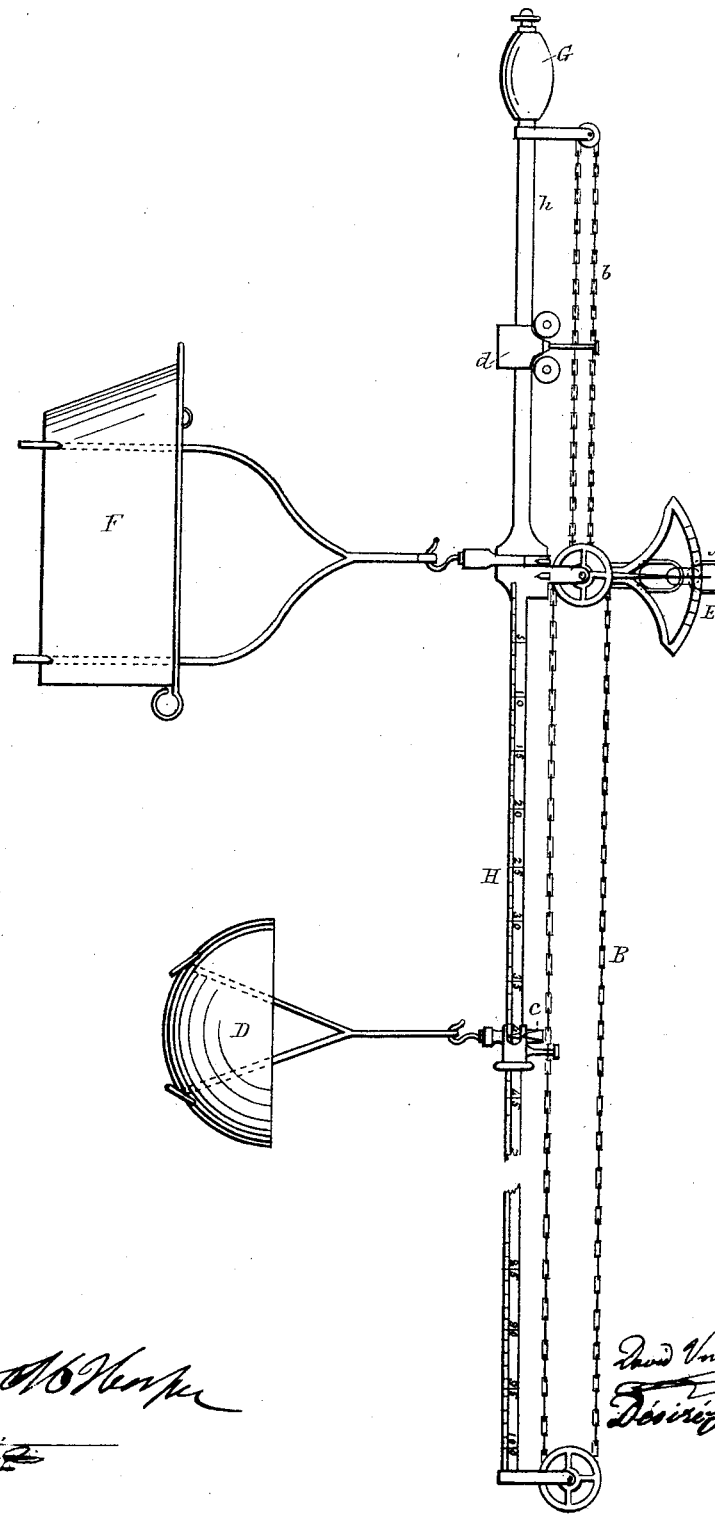

UNITED STATES PATENT OFFICE.

DAVID VINCENT AND DÉSIRÉ JOHNEN, OF PARIS, FRANCE.

WEIGHING-SCALE.

SPECIFICATION forming part of Letters Patent No. 228,843, dated June 15, 1880.

Application filed April 1, 1879.

*To all whom it may concern:*

Be it known that we, DAVID VINCENT and DÉSIRÉ JOHNEN, both of the city of Paris, in the Republic of France, have invented a Scale, of which the following is a specification.

The object of this invention is to determine or ascertain the number of objects of equal weight placed in the scale without having recourse to counting each separately, the scale being equally eligible for weighing in the usual manner, the arrangement of the apparatus being such that its action is automatic. By this novel arrangement a great saving of time is gained, since packets containing a certain number of gross of articles may be numerically ascertained and their united weight determined at pleasure.

The accompanying drawing, in conjunction with the following description thereof, will clearly illustrate the nature of the invention and the mode of carrying it into effect.

The drawing here represents a lever-balance having a large and small scale, F and D, respectively. This lever is divided into two parts, forming a long and short arm, the former, H, bearing a graduated scale, forming a counter. The other, h, bears a counterpoise, G, for maintaining the equilibrium of the scale.

On the whole lever two sliding indices are placed, one of which, C, serves as support to the scale D and moves backward or forward, as required, along the graduated scale or counter of the arm H, while the other, d, moves on the short arm h. The disposition of these indices on the respective levers or arms admits of the balance always maintaining a perfectly horizontal position, while the scales D and F are free. This equipoise is effected by aid of the chains B and b, communicating with the indices in such wise that the large index or hand e of the dial E is always at zero, proving that the balance is perfectly horizontal.

The apparatus may be hung by a chain, A, in any convenient place, or to a hook fixed in a beam.

It need hardly be mentioned that the scale may be made of any required dimensions to suit the uses to which it is to be applied.

The action of the apparatus is as follows, taking as example the method of ascertaining the number of articles of similar weight placed in the large scale or basin F, as this forms the characteristic feature of the invention: In determining the number of gross of merchandise, as would occur in the sale of such articles, any number of gross packets are put into the large scale F and one gross in the other scale, D, and this latter, with its fixed index, being moved along the counter or graduated scale, should it stop at 40, as shown in the drawing, it will be found on examination that there will be forty packets in the large scale F.

As a further example, suppose a certain number of five-franc pieces or other money are placed in F and one franc piece in D, and the index is moved till equilibrium is established, and supposing the equipoise is discovered at 98, then it will be found that there are ninety-eight pieces of money in F.

We claim as our invention—

The balance-lever formed of the long arm or graduated counter H, short arm h, indices C and d, chains B and b, with scales F and D, as and for the purposes herein specified, and as illustrated by the accompanying drawing.

DAVID VINCENT.
DÉSIRÉ JOHNEN.

Witnesses:
ROBT. M. HOOPER,
E. MÉTERE.